US012252182B2

United States Patent
Peng et al.

(10) Patent No.: US 12,252,182 B2
(45) Date of Patent: Mar. 18, 2025

(54) BODY FRAME JOINT AND VEHICLE HAVING SAME

(71) Applicant: BYD COMPANY LIMITED, Guangdong (CN)

(72) Inventors: Wang Peng, Shenzhen (CN); Fengshou Huang, Shenzhen (CN); Zhiqiang Wang, Shenzhen (CN); Zhen Chen, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/473,893

(22) Filed: Sep. 25, 2023

(65) Prior Publication Data

US 2024/0017773 A1    Jan. 18, 2024

Related U.S. Application Data

(63) Continuation of application No. 17/681,178, filed on Feb. 25, 2022, now Pat. No. 11,858,558, which is a
(Continued)

(30) Foreign Application Priority Data

Aug. 30, 2019    (CN) .......................... 201910812459.4

(51) Int. Cl.
*B62D 27/02*     (2006.01)
*B62D 25/02*     (2006.01)
(Continued)

(52) U.S. Cl.
CPC ........... *B62D 27/023* (2013.01); *B62D 25/02* (2013.01); *B62D 25/04* (2013.01); *B62D 27/065* (2013.01); *B62D 31/02* (2013.01)

(58) Field of Classification Search
CPC .. B62D 27/023; B62D 27/065; B62D 29/008; B62D 31/02; B62D 25/02; B62D 25/04
(Continued)

(56) References Cited

U.S. PATENT DOCUMENTS 3,592,493 A      7/1971   Goose
4,230,361 A  *  10/1980   Nachbur .............. B62D 29/008
                                                    296/30
(Continued)

FOREIGN PATENT DOCUMENTS

CN       105882768 A      8/2016
CN       105889241 A      8/2016
(Continued)

OTHER PUBLICATIONS

CN109050680 Text (Year: 2018).*
(Continued)

*Primary Examiner* — Dennis H Pedder
(74) *Attorney, Agent, or Firm* — Calfee, Halter & Griswold LLP

(57) ABSTRACT

A body frame and a vehicle having the same are provided. The body frame includes: a transverse beam, provided with a transverse sliding groove; a longitudinal beam, connected with the transverse beam and provided with a longitudinal sliding groove; and a joint, disposed at a junction of the transverse beam and the longitudinal beam and mounted to the transverse beam by a transverse rivet and to the longitudinal beam by a longitudinal rivet. The transverse rivet is slidably mated with the transverse sliding groove, and the longitudinal rivet is slidably mated with the longitudinal sliding groove.

20 Claims, 12 Drawing Sheets

Related U.S. Application Data continuation of application No. PCT/CN2020/109158, filed on Aug. 14, 2020.

(51) Int. Cl.
 *B62D 25/04* (2006.01)
 *B62D 27/04* (2006.01)
 *B62D 27/06* (2006.01)
 *B62D 31/02* (2006.01)

(58) Field of Classification Search
 USPC .............................. 296/203.01–4, 29, 30, 178
 See application file for complete search history.

(56) References Cited

U.S. PATENT DOCUMENTS

| | | | | |
|---|---|---|---|---|
| 5,116,161 | A | * | 5/1992 | Faisst .................... E06B 3/5885 403/231 |
| 8,414,068 | B1 | * | 4/2013 | Na ....................... B62D 27/023 296/193.06 |

FOREIGN PATENT DOCUMENTS

| | | | |
|---|---|---|---|
| CN | 103158790 | B | 4/2017 |
| CN | 106864599 | A | 6/2017 |
| CN | 108974144 | A | 12/2018 |
| CN | 109050680 | * | 12/2018 |
| CN | 208947072 | U | 6/2019 |
| CN | 109969272 | A | 7/2019 |
| FR | 2119246 | | 8/1972 |
| FR | 2587067 | A1 | 3/1987 |
| GB | 1347780 | A | 2/1974 |
| JP | 2004060789 | A | 2/2004 |
| KR | 20100016683 | A | 2/2010 |
| WO | 9207748 | A1 | 5/1992 |

OTHER PUBLICATIONS

International Search Report from PCT /CN2020/109158 dated Nov. 23, 2020 (3 pages).
Restriction Requirement from U.S. Appl. No. 17/681,178 dated Mar. 6, 2023.
Office Action from U.S. Appl. No. 17/681,178 dated May 5, 2023.
Notice of Allowance from U.S. Appl. No. 17/681,178 dated Aug. 11, 2023.

\* cited by examiner

BODY FRAME JOINT AND VEHICLE HAVING SAME

CROSS-REFERENCE TO RELATED APPLICATIONS

The application is a continuation of U.S. application Ser. No. 17/681,178, filed Feb. 25, 2022, which is a bypass continuation application under 35 U.S.C. § 111 of PCT/CN2020/109158 having the international application filing date of Aug. 14, 2020, which claims priority to Chinese Patent Application No. 201910812459.4, entitled "BODY FRAME AND VEHICLE HAVING SAME" and filed by BYD Co., Ltd. on Aug. 30, 2019. The entire contents are incorporated herein by reference.

FIELD

The disclosure relates to the technical field of vehicles, and more specifically, to a body frame and a vehicle having the same.

BACKGROUND

In related arts, body frames of vehicles, such as commercial vehicles generally have beam structures, wherein transverse beams and longitudinal beams intersect and connect with each other. Junctions of the transverse beams and the longitudinal beams are further fixed by joints. The joints are generally connected with the body frame by using bolts. Therefore, during production, the tightening torque is likely to be insufficient, resulting in loosening of the bolts in use. In addition, during actual operation, the bolt connection is cumbersome, affecting the assembly efficiency.

SUMMARY

The disclosure is intended to solve at least one of the technical problems in related arts. The disclosure is intended to provide a body frame. The body frame has a reliable structure without loosening, and can be conveniently assembled.

A vehicle having the afore-mentioned body frame is disclosed.

An embodiment of a first aspect of the disclosure provides a body frame. The body frame includes: a transverse beam, provided with a transverse sliding groove; a longitudinal beam, connected with the transverse beam and provided with a longitudinal sliding groove; and a joint, disposed at a junction of the transverse beam and the longitudinal beam and mounted to the transverse beam by a transverse rivet and to the longitudinal beam by a longitudinal rivet. The transverse rivet is slidably mated with the transverse sliding groove, and the longitudinal rivet is slidably mated with the longitudinal sliding groove.

According to the body frame in this embodiment of the disclosure, the joint is mounted to the transverse beam by the transverse rivet and to the longitudinal beam by the longitudinal rivet. Therefore, using the rivet instead of the bolt connection in related arts avoids loosening caused by an insufficient tightening torque, and effectively improves the structural strength. In addition, by means of the mated connection between the rivets and the sliding grooves, the connection strength can be improved, and the assembly is more convenient, improving the assembly efficiency.

According to some specific embodiments of the disclosure, the transverse beam includes a side top beam, the longitudinal beam includes a side vertical beam, and the joint includes an all-cover joint disposed at a junction of the side top beam and the side vertical beam. The all-cover joint includes: a first sub-joint; and a second sub-joint, wherein a transverse beam connection groove and a longitudinal beam connection groove are defined by engaging the first sub-joint and the second sub-joint, the transverse beam connection groove is adapted to accommodate the side top beam, and the longitudinal beam connection groove is adapted to accommodate the side vertical beam.

According to some specific embodiments of the disclosure, the first sub-joint includes a first transverse beam connecting plate, a first longitudinal beam connecting plate, and a first side plate. The first transverse beam connecting plate is connected with the first longitudinal beam connecting plate, and the first side plate is connected with a side of the first transverse beam connecting plate and the first longitudinal beam connecting plate away from the second sub-joint.

The second sub-joint includes a second transverse beam connecting plate, a second longitudinal beam connecting plate, and a second side plate. The second transverse beam connecting plate is connected with the second longitudinal beam connecting plate. The second side plate is connected with a side of the second transverse beam connecting plate and the second longitudinal beam connecting plate away from the first sub-joint.

According to some specific embodiments of the disclosure, the transverse sliding groove includes a first transverse sliding groove and a second transverse sliding groove, and the longitudinal sliding groove includes a first longitudinal sliding groove and a second longitudinal sliding groove. The first transverse sliding groove and the second transverse sliding groove extend in a length direction of the body frame, and the first longitudinal sliding groove and the second longitudinal sliding groove extend in a height direction of the body frame.

According to some specific embodiments of the disclosure, the transverse rivet includes a first transverse rivet and a second transverse rivet, and the longitudinal rivet includes a first longitudinal rivet and a second longitudinal rivet.

The first transverse beam connecting plate is provided with a first transverse screw rod hole, and the first transverse rivet includes a first transverse screw rod mated with the first transverse screw rod hole and a first transverse collar riveted on the first transverse screw rod. The first transverse screw rod is slidably mated with the first transverse sliding groove.

The second transverse beam connecting plate is provided with a second transverse screw rod hole, and the second transverse rivet includes a second transverse screw rod mated with the second transverse screw rod hole and a second transverse collar riveted on the second transverse screw rod. The second transverse screw rod is slidably mated with the second transverse sliding groove.

The first longitudinal beam connecting plate is provided with a first longitudinal screw rod hole, and the first longitudinal rivet includes a first longitudinal screw rod mated with the first longitudinal screw rod hole and a first longitudinal collar riveted on the first longitudinal screw rod. The first longitudinal screw rod is slidably mated with the first longitudinal sliding groove.

The second longitudinal beam connecting plate is provided with a second longitudinal screw rod hole, and the second longitudinal rivet includes a second longitudinal screw rod mated with the second longitudinal screw rod hole and a second longitudinal collar riveted on the second longitudinal screw rod. The second longitudinal screw rod is slidably mated with the second longitudinal sliding groove.

According to some specific embodiments of the disclosure, a first transverse gasket between the first transverse screw rod and the first transverse beam connecting plate is sleeved on the first transverse screw rod. The first transverse gasket is slidably mated with the first transverse sliding groove.

A second transverse gasket between the second transverse screw rod and the second transverse beam connecting plate is sleeved on the second transverse screw rod. The second transverse gasket is slidably mated with the second transverse sliding groove.

According to some specific embodiments of the disclosure, a first longitudinal gasket between the first longitudinal screw rod and the first longitudinal beam connecting plate is sleeved on the first longitudinal screw rod. The first longitudinal gasket is slidably mated with the first longitudinal sliding groove.

A second longitudinal gasket between the second longitudinal screw rod and the second longitudinal beam connecting plate is sleeved on the second longitudinal screw rod. The second longitudinal gasket is slidably mated with the second longitudinal sliding groove.

According to some specific embodiments of the disclosure, the side top beam is provided with a plug beam. The plug beam is inserted into the side vertical beam and fixed to the side vertical beam by riveting.

According to some specific embodiments of the disclosure, the transverse beam includes a side waist beam, the longitudinal beam includes the side vertical beam, and the joint includes a semi-cover joint disposed at a junction of the side waist beam and the side vertical beam. The semi-cover joint includes: a transverse beam connecting plate, wherein the transverse rivet includes a third transverse rivet and a fourth transverse rivet disposed on the transverse beam connecting plate, and the transverse beam connecting plate is mounted to the side waist beam by the third transverse rivet and the fourth transverse rivet; and a longitudinal beam connecting plate, connected with the transverse beam connecting plate, wherein the longitudinal rivet includes a third longitudinal rivet and a fourth longitudinal rivet disposed on the longitudinal beam connecting plate, and the longitudinal beam connecting plate is mounted to the side vertical beam by the third longitudinal rivet and the fourth longitudinal rivet. A central axis of the third transverse rivet and a central axis of the third longitudinal rivet are located in a first plane, and a central axis of the fourth transverse rivet and a central axis of the fourth longitudinal rivet are located in a second plane. The first plane and the second plane are disposed in parallel and perpendicular to a width direction of the body frame.

According to some specific embodiments of the disclosure, the body frame further includes: a side skin; and an integrated transverse beam. The transverse beam under the skin, a transverse beam for mounting a seat, and a transverse beam of an in-vehicle sealing plate are integrated as a whole by the integrated transverse beam, and the integrated transverse beam is connected with a lower edge of the side skin.

According to some specific embodiments of the disclosure, the body frame further includes: a plurality of top longitudinal beams, disposed along the length direction of the body frame and spaced apart from each other along the width direction of the body frame; and a plurality of support profiles, wherein each of the support profiles is disposed on a corresponding top longitudinal beam and is configured with a battery pack sliding groove. A battery pack mounting member is slidably mated with the battery pack sliding groove.

According to some specific embodiments of the disclosure, the body frame further includes: a plurality of top transverse beams; a top edge beam, extending in the length direction of the body frame and connected with the plurality of top transverse beams; a plurality of side vertical beams; and a side top beam, extending in the length direction of the body frame and connected with the plurality of side vertical beams. The top edge beam and the side top beam are riveted.

According to some specific embodiments of the disclosure, the body frame further includes: a rack; a corbel mounting plate, mounted to the rack and having a mounting surface, wherein an adjustment gap exists between the mounting surface and the rack; and a side frame, mounted to the mounting surface of the corbel mounting plate.

According to some specific embodiments of the disclosure, the body frame further includes: door pillars; a rack edge beam, wherein the door pillars and the rack edge beam are riveted; and a rack doorframe beam, connected with the rack edge beam and located between the door pillars.

An embodiment of a second aspect of the disclosure provides a vehicle. The vehicle includes the body frame according to the embodiment of the first aspect of the disclosure.

By means of the body frame according to the embodiment of the first aspect of the disclosure, the vehicle according to this embodiment of the disclosure achieves a stable and reliable structure and high production efficiency.

Other aspects and advantages of the disclosure will be given in the following description, some of which will become apparent from the following description or may be learned from practices of the disclosure.

Figure 1:
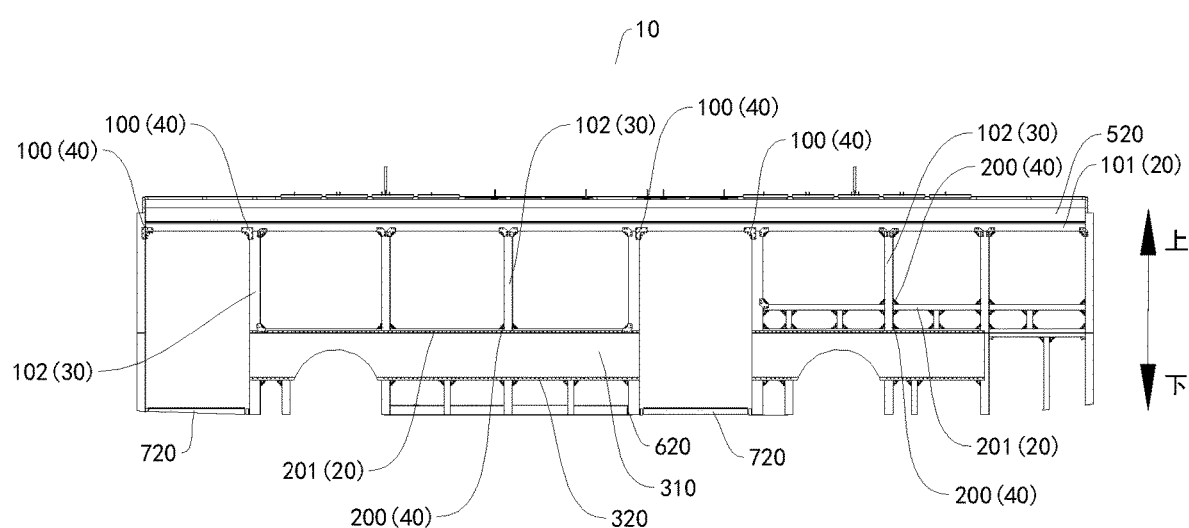
FIG. 1 is a schematic structural diagram of a body frame according to an embodiment of the disclosure.

Vehicle 1,

Body frame 10, Transverse beam 20, Transverse sliding groove 21, Longitudinal beam 30, Longitudinal sliding groove 31, Joint 40, Transverse rivet 41, Longitudinal rivet 42, All-cover joint 100, Side top beam 101, Side vertical beam 102, Plug beam 103, First sub-joint 110, Second sub-joint 120, Transverse beam connection groove 130, First transverse beam connecting plate 111, First longitudinal beam connecting plate 112, First side plate 113, Second transverse beam connecting plate 121, Second longitudinal beam connecting plate 122, Second side plate 123, Countersunk screw 152, First transverse sliding groove 161, Second transverse sliding groove 162, First longitudinal sliding groove 163, Second longitudinal sliding groove 164, First transverse rivet 171, Second transverse rivet 172, First longitudinal rivet 173, Second longitudinal rivet 174, First transverse screw rod 182, First transverse collar 183, Second transverse screw rod 185, Second transverse collar 186, First longitudinal screw rod 192, First longitudinal collar 193, Second longitudinal screw rod 195, Second longitudinal collar 196, First transverse gasket 160, Second transverse gasket 170, First longitudinal gasket 180, Second longitudinal gasket 190, Semi-cover joint 200, Side waist beam 201, Transverse beam connecting plate 210, Longitudinal beam connecting plate 220, Third transverse rivet 231, Fourth transverse rivet 232, Third longitudinal rivet 233, Fourth longitudinal rivet 234, Third transverse sliding groove 261, Fourth transverse sliding groove 262, Third longitudinal sliding groove 263, Fourth longitudinal sliding groove 264, Third transverse screw rod hole 281, Third transverse screw rod 282, Third transverse collar 283, Fourth transverse screw rod hole 284, Fourth transverse screw rod 285, Fourth transverse collar 286, Third longitudinal screw rod hole 291, Third longitudinal screw rod 292, Third longitudinal collar 293, Fourth longitudinal screw rod hole 294, Fourth longitudinal screw rod 295, Fourth longitudinal collar 296, Third transverse gasket 260, Fourth transverse gasket 270, Third longitudinal gasket 280, Fourth longitudinal gasket 290, Side skin 310, Integrated transverse beam 320, Top longitudinal beam 410, Support profile 420, Battery pack sliding groove 430, Slot 431, Battery pack mounting member 440, Bolt 441, Battery pack 450, Top transverse beam 510, Top edge beam 520, Outer connecting edge 521, Inner connecting edge 523, Rack 610, Rack edge beam 611, Corbel mounting plate 620, Mounting surface 621, Adjustment gap 622, Corbel connecting plate 623, Corbel side plate 624, Side frame 630, Door pillar 710, Rack doorframe beam 720.

DETAILED DESCRIPTION

Embodiments of the disclosure are described in detail below, and examples of the embodiments are shown in the accompanying drawings. Wherein the same or similar reference numerals indicate the same or similar elements or elements having the same or a similar function throughout. The embodiments described below with reference to the accompanying drawings are exemplary, and are intended to explain the disclosure and cannot be construed as a limitation to the disclosure.

In the description of the disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the disclosure.

In the description of the disclosure, "first feature" and "second feature" may include one feature or a plurality of features. In addition, "a plurality of" refers to two or more than two, and "several" refers to one or more.

A body frame 10 according to the embodiments of the disclosure is described below with reference to the accompanying drawings.

As shown in FIG. 1 to FIG. 7, the body frame 10 according to this embodiment of the disclosure includes a transverse beam 20, a longitudinal beam 30, and a joint 40.

Figure 3:
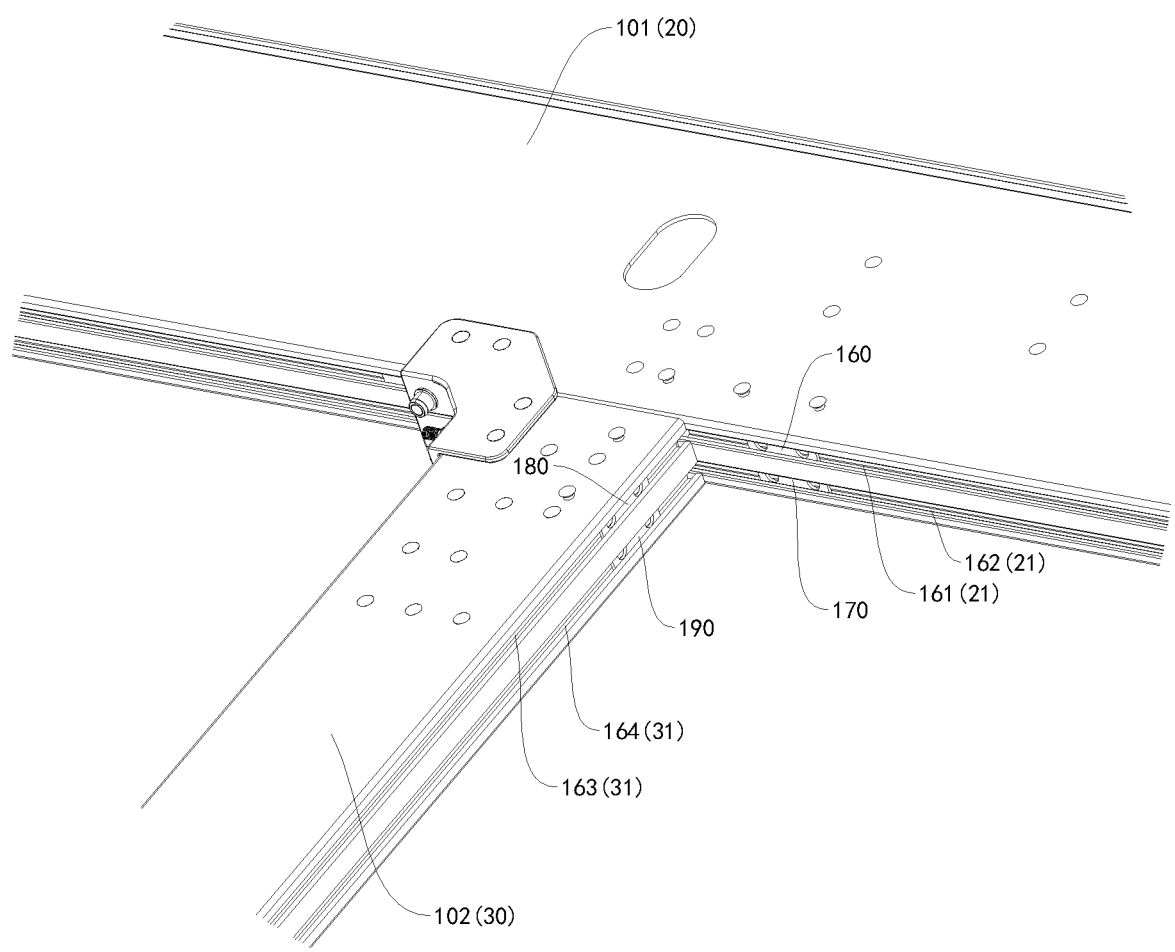
FIG. 3 is a structural schematic diagram of a transverse beam and a longitudinal beam of the body frame according to an embodiment of the disclosure.

As shown in FIG. 3, the transverse beam 20 may extend in a length direction of the body frame 10, the longitudinal beam 30 may extend in a height direction of the body frame 10, and the longitudinal beam 30 is connected with the transverse beam 20. The transverse beam 20 is provided with a transverse sliding groove 21 extending in a length direction of the transverse beam, and the longitudinal beam 30 is provided with a longitudinal sliding groove 31 extending in a length direction of the longitudinal beam. The joint 40 is disposed at a junction of the transverse beam 20 and the longitudinal beam 30. The joint 40 is mounted to the transverse beam 20 by a transverse rivet 41 and to the longitudinal beam 30 by a longitudinal rivet 42. The transverse rivet 41 is slidably mated with the transverse sliding groove 21, and the longitudinal rivet 42 is slidably mated with the longitudinal sliding groove 31.

According to the body frame 10 in this embodiment of the disclosure, the joint 40 is mounted to the transverse beam 20 by the transverse rivet 41 and to the longitudinal beam 30 by the longitudinal rivet 42. Therefore, using the rivet instead of the bolt connection in related arts avoids loosening caused by an insufficient tightening torque, and effectively improves the structural strength. In addition, the transverse beam 20 is provided with the transverse sliding groove 21, the longitudinal beam 30 is provided with the longitudinal sliding groove 31, the transverse rivet 41 is slidably mated with the transverse sliding groove 21, and the longitudinal rivet 42 is slidably mated with the longitudinal sliding groove 31. By means of the mated connection between the rivets and the sliding grooves, the connection strength can be improved, and the assembly is more convenient, improving the assembly efficiency.

Therefore, the body frame 10 according to this embodiment of the disclosure has a reliable structure without loosening, and can be conveniently assembled.

In some specific embodiments of the disclosure, as shown in FIG. 1 to FIG. 5, the transverse beam 20 includes a side top beam 101, the longitudinal beam 30 includes a side vertical beam 102, and the joint 40 includes an all-cover joint 100 disposed at a junction of the side top beam 101 and the side vertical beam 102.

Figure 4:
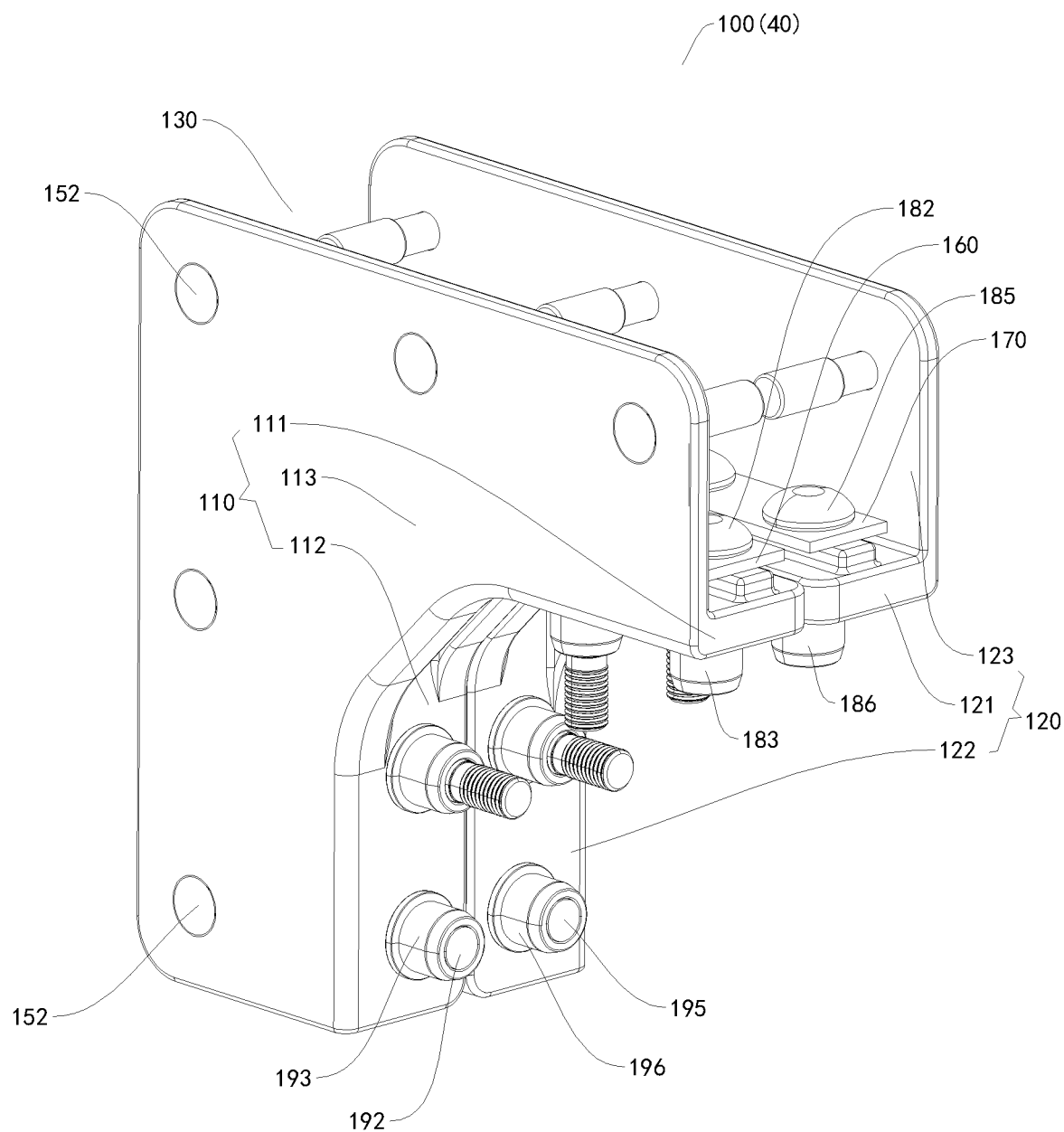
FIG. 4 is a schematic structural diagram of the all-cover joint of the body frame according to an embodiment of the disclosure.

As shown in FIG. 4, the all-cover joint 100 includes a first sub-joint 110 and a second sub-joint 120. A transverse beam connection groove 130 and a longitudinal beam connection groove (not shown in the figure) are defined by engaging the first sub-joint 110 and the second sub-joint 120. The transverse beam connection groove 130 is adapted to accommodate the side top beam 101, and the longitudinal beam connection groove is adapted to accommodate the side vertical beam 102.

For example, the first sub-joint 110 and the second sub-joint 120 are arranged along a width direction of the body frame 10. The first sub-joint 110 and the second sub-joint 120 are respectively connected with the side top beam 101 and the side vertical beam 102, and the first sub-joint 110 and the second sub-joint 120 are in mirror symmetry with respect to a central plane of the body frame 10. The transverse beam connection groove 130 and the longitudinal beam connection groove are in communication with each other and may be disposed vertically. The transverse beam connection groove 130 extends in a length direction of the body frame 10, and has an opening facing the side top beam 101. The longitudinal beam connection groove extends in a height direction of the body frame 10, and has an opening facing the side vertical beam 102.

The first sub-joint 110 and the second sub-joint 120 are disposed separately. Therefore, the all-cover joint 100 can have a relatively simple structure and can be conveniently mounted, and die sinking of the single casting (the first sub-joint 110 and the second sub-joint 120) can be easily performed, improving the production efficiency.

In addition, the transverse beam connection groove 130 and the longitudinal beam connection groove are defined by engaging the first sub-joint 110 and the second sub-joint 120. Therefore, the transverse beam connection groove 130 can be used to accommodate the side top beam 101, and the longitudinal beam connection groove can be used to accommodate the side vertical beam 102. In this way, the side top beam 101 and the side vertical beam 102 can be positioned by the all-cover joint 100 along a plurality of directions, improving the fatigue endurance, thereby improving the connection stiffness, and reducing the deformation.

In addition, since the connection stiffness is ensured, and the all-cover joint 100 is a separated structure, the first sub-joint 110 and the second sub-joint 120 can be mounted separately and finally engaged and sandwiched at a junction of the side top beam 101 and the side vertical beam 102 during assembling. The assembly manner has lower requirements for the vehicle assembly accuracy, is more convenient to operate, and can greatly improve the assembly efficiency.

According to some specific embodiments of the disclosure, as shown in FIG. 2 to FIG. 5, the first sub-joint 110 includes a first transverse beam connecting plate 111, a first longitudinal beam connecting plate 112, and a first side plate 113.

The first transverse beam connecting plate 111 is connected with the first longitudinal beam connecting plate 112, and the first side plate 113 is connected with a side of the first transverse beam connecting plate 111 and the first longitudinal beam connecting plate 112 away from the second sub-joint 120.

The second sub-joint 120 includes a second transverse beam connecting plate 121, a second longitudinal beam connecting plate 122, and a second side plate 123.

The second transverse beam connecting plate 121 is connected with the second longitudinal beam connecting plate 122, and the second side plate 123 is connected with a side of the second transverse beam connecting plate 121 and the second longitudinal beam connecting plate 122 away from the first sub-joint 110.

The first transverse beam connecting plate 111 and the second transverse beam connecting plate 121 are engaged, the transverse beam connection groove 130 is defined by the first transverse beam connecting plate and the second transverse beam connecting plate and the first side plate 113 and the second side plate 123. The first longitudinal beam connecting plate 112 and the second longitudinal beam connecting plate 122 are engaged, the longitudinal beam connection groove is defined by the first longitudinal beam connecting plate and the second longitudinal beam connecting plate and the first side plate 113 and the second side plate 123. The side top beam 101 and the side vertical beam 102 are sandwiched between the first side plate 113 and the second side plate 123.

For example, the first transverse beam connecting plate 111, the first longitudinal beam connecting plate 112, and the first side plate 113 may be integrally formed. The second transverse beam connecting plate 121, the second longitudinal beam connecting plate 122, and the second side plate 123 may be integrally formed. The first sub-joint 110 and the second sub-joint 120 may be made of an aluminum alloy material. The first transverse beam connecting plate 111 and the first longitudinal beam connecting plate 112 may be perpendicular to the first side plate 113, the second transverse beam connecting plate 121 and the second longitudinal beam connecting plate 122 may be perpendicular to the second side plate 123, and the first side plate 113 may be parallel to the second side plate 123. In this way, the all-cover joint 100 is connected with inner and outer surfaces and lower surfaces of the side top beam 101 and inner and outer surfaces and one side surface of the side vertical beam 102, which is stable and reliable, so that the stiffness and strength are improved, and the connection strength of the body frame 10 is improved. The first sub-joint 110 and the second sub-joint 120 are made of an aluminum alloy material, so that the overall weight of a vehicle can be reduced.

Figure 2:
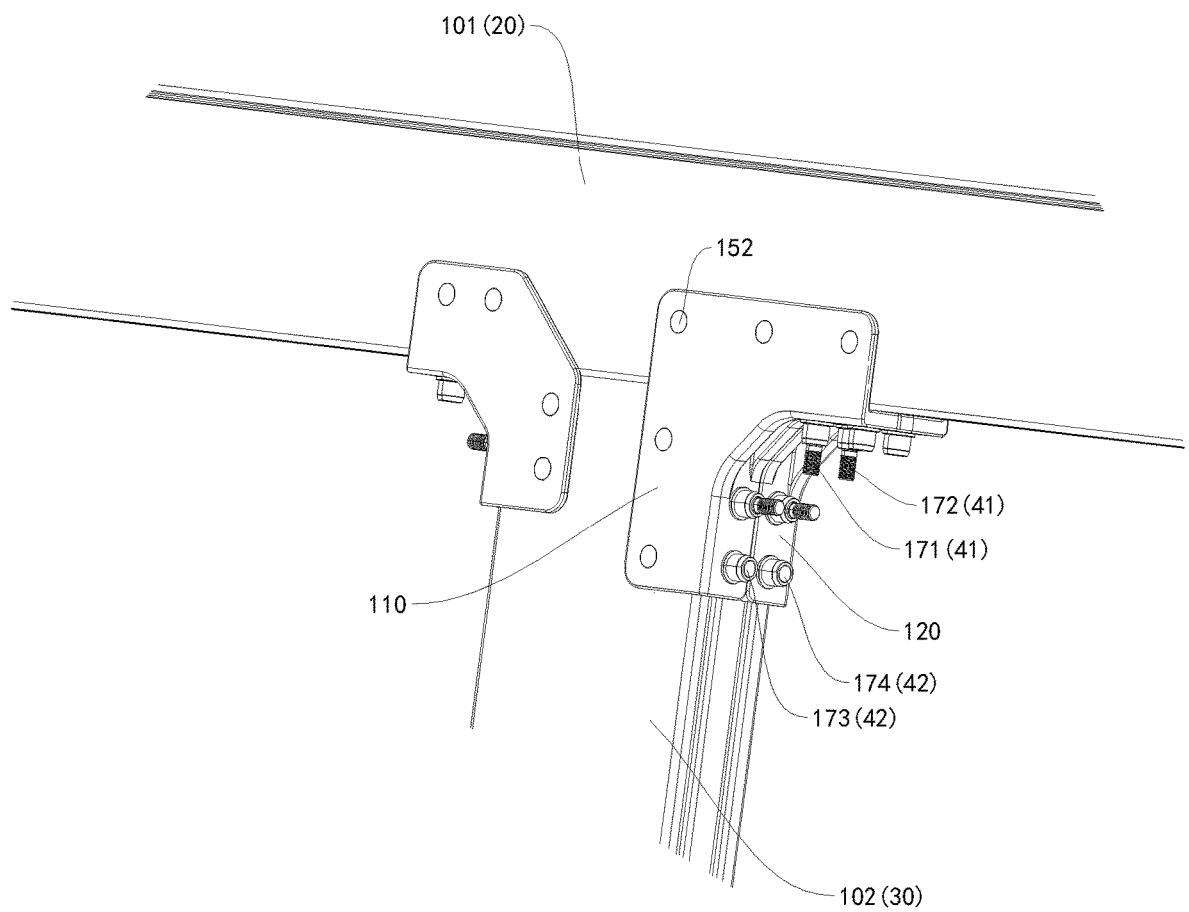
FIG. 2 is a schematic connection diagram of an all-cover joint of the body frame according to an embodiment of the disclosure.

According to some specific embodiments of the disclosure, as shown in FIG. 2 and FIG. 4, the first side plate 113 and the second side plate 123 are provided with countersunk screw holes. The first side plate 113 is mounted to the side top beam 101 and the side vertical beam 102 by countersunk screws 152 mated with the countersunk head screw holes of the first side plate, and the second side plate 123 is mounted to the side top beam 101 and the side vertical beam 102 by countersunk screws 152 mated with the countersunk head screw holes of the second side plate.

Specifically, the countersunk screw holes are configured with slots, outer surfaces of the countersunk screws 152 on the first side plate 113 are flush with an outer surface of the first side plate 113, and outer surfaces of the countersunk screws 152 on the second side plate 123 are flush with an outer surface of the second side plate 123.

For example, a side surface of the first side plate 113 facing the second side plate 123 and a side surface of the second side plate 123 facing the first side plate 113 are respectively connected with two opposite sides of the side top beam 101 and the side vertical beam 102 along the width direction of the body frame 10. For example, the side surface of the first side plate 113 facing the second side plate 123 is connected with a side of the side top beam 101 and the side vertical beam 102 facing an outer side of the vehicle, and the side surface of the second side plate 123 facing the first side plate 113 is connected with a side of the side top beam 101 and the side vertical beam 102 facing an inner side of the vehicle. In this way, the connection area of the all-cover joint 100 is increased, and the connection strength is improved.

According to some embodiments of the disclosure, as shown in FIG. 2 to FIG. 5, the transverse sliding groove 21 includes a first transverse sliding groove 161 and a second transverse sliding groove 162, and the longitudinal sliding groove 31 is configured with a first longitudinal sliding groove 163 and a second longitudinal sliding groove 164. The first transverse sliding groove 161 and the second transverse sliding groove 162 extend in the length direction of the body frame 10, and the first longitudinal sliding groove 163 and the second longitudinal sliding groove 164 extend in the height direction of the body frame 10.

The transverse rivet 41 includes a first transverse rivet 171 and a second transverse rivet 172, and the longitudinal rivet 42 includes a first longitudinal rivet 173 and a second longitudinal rivet 174.

The first transverse beam connecting plate 111 is provided with a first transverse screw rod hole. The first transverse rivet 171 includes a first transverse screw rod 182 mated with the first transverse screw rod hole and a first transverse collar 183 riveted on the first transverse screw rod 182. The first transverse screw rod 182 is slidably mated with the first transverse sliding groove 161.

The second transverse beam connecting plate 121 is provided with a second transverse screw rod hole. The second transverse rivet 172 includes a second transverse screw rod 185 mated with the second transverse screw rod hole and a second transverse collar 186 riveted on the second transverse screw rod 185. The second transverse screw rod 185 is slidably mated with the second transverse sliding groove 162.

The first longitudinal beam connecting plate 112 is provided with a first longitudinal screw rod hole, and the first longitudinal rivet 173 includes a first longitudinal screw rod 192 mated with the first longitudinal screw rod hole and a first longitudinal collar 193 riveted on the first longitudinal screw rod 192. The first longitudinal screw rod 192 is slidably mated with the first longitudinal sliding groove 163.

The second longitudinal beam connecting plate 122 is provided with a second longitudinal screw rod hole, and the second longitudinal rivet 174 includes a second longitudinal screw rod 195 mated with the second longitudinal screw rod hole and a second longitudinal collar 196 riveted on the second longitudinal screw rod 195. The second longitudinal screw rod 195 is slidably mated with the second longitudinal sliding groove 164.

In this way, by means of the connection by using double sliding grooves, not only the connection strength can be improved, but also the deformation and the vibration of the vehicle can be reduced, thereby improving the durability of the vehicle. Moreover, it is convenient to adjust the position of the all-cover joint 100 during the mounting, and the assembly operation is also more convenient.

Further, as shown in FIG. 3 and FIG. 4, a first transverse gasket 160 between the first transverse screw rod 182 and the first transverse beam connecting plate 111 is sleeved on the first transverse screw rod 182. The first transverse gasket 160 is slidably mated with the first transverse sliding groove 161. A second transverse gasket 170 between the second transverse screw rod 185 and the second transverse beam connecting plate 121 is sleeved on the second transverse screw rod 185. The second transverse gasket 170 is slidably mated with the second transverse sliding groove 162. The first transverse gasket 160 and the second transverse gasket 170 may be made of an aluminum alloy material.

A first longitudinal gasket 180 between the first longitudinal screw rod 192 and the first longitudinal beam connecting plate 112 is sleeved on the first longitudinal screw rod 192. The first longitudinal gasket 180 is slidably mated with the first longitudinal sliding groove 163. A second longitudinal gasket 190 between the second longitudinal screw rod 195 and the second longitudinal beam connecting plate 122 is sleeved on the second longitudinal screw rod 195. The second longitudinal gasket 190 is slidably mated with the second longitudinal sliding groove 164. The first longitudinal gasket 180 and the second longitudinal gasket 190 may be made of an aluminum alloy material.

For example, the first transverse gasket 160, the second transverse gasket 170, the first longitudinal gasket 180, and the second longitudinal gasket 190 each may be an aluminum alloy sheet. The first transverse gasket, the second transverse gasket, the first longitudinal gasket, and the second longitudinal gasket are provided with a through hole on a center line for mounting the first transverse screw rod 182, the second transverse screw rod 185, the first longitudinal screw rod 192, and the second longitudinal screw rod 195. Sizes of the through holes may be increased or decreased according to actual conditions. After the mounting is finished, the first transverse gasket 160, the second transverse gasket 170, the first longitudinal gasket 180, and the second longitudinal gasket 190 are respectively attached to bottoms of the first transverse sliding groove 161, the second transverse sliding groove 162, the first longitudinal sliding groove 163, and the second longitudinal sliding groove 164.

The first transverse gasket 160, the second transverse gasket 170, the first longitudinal gasket 180, and the second longitudinal gasket 190 are made of the aluminum alloy material, so that the weight of the vehicle can be effectively reduced. In addition, when the side top beam 101 and the side vertical beam 102 are stressed, loads are applied to contact surfaces of the first transverse gasket 160, the second transverse gasket 170, the first longitudinal gasket 180, and the second longitudinal gasket 190 with the first transverse sliding groove 161, the second transverse sliding groove 162, the first longitudinal sliding groove 163, and the second longitudinal sliding groove 164. Therefore, the stress concentration of the first transverse sliding groove 161, the second transverse sliding groove 162, the first longitudinal sliding groove 163, and the second longitudinal sliding groove 164 can be reduced, so that the requirements for the strength and the deformation of the body frame can be satisfied.

Figure 5:
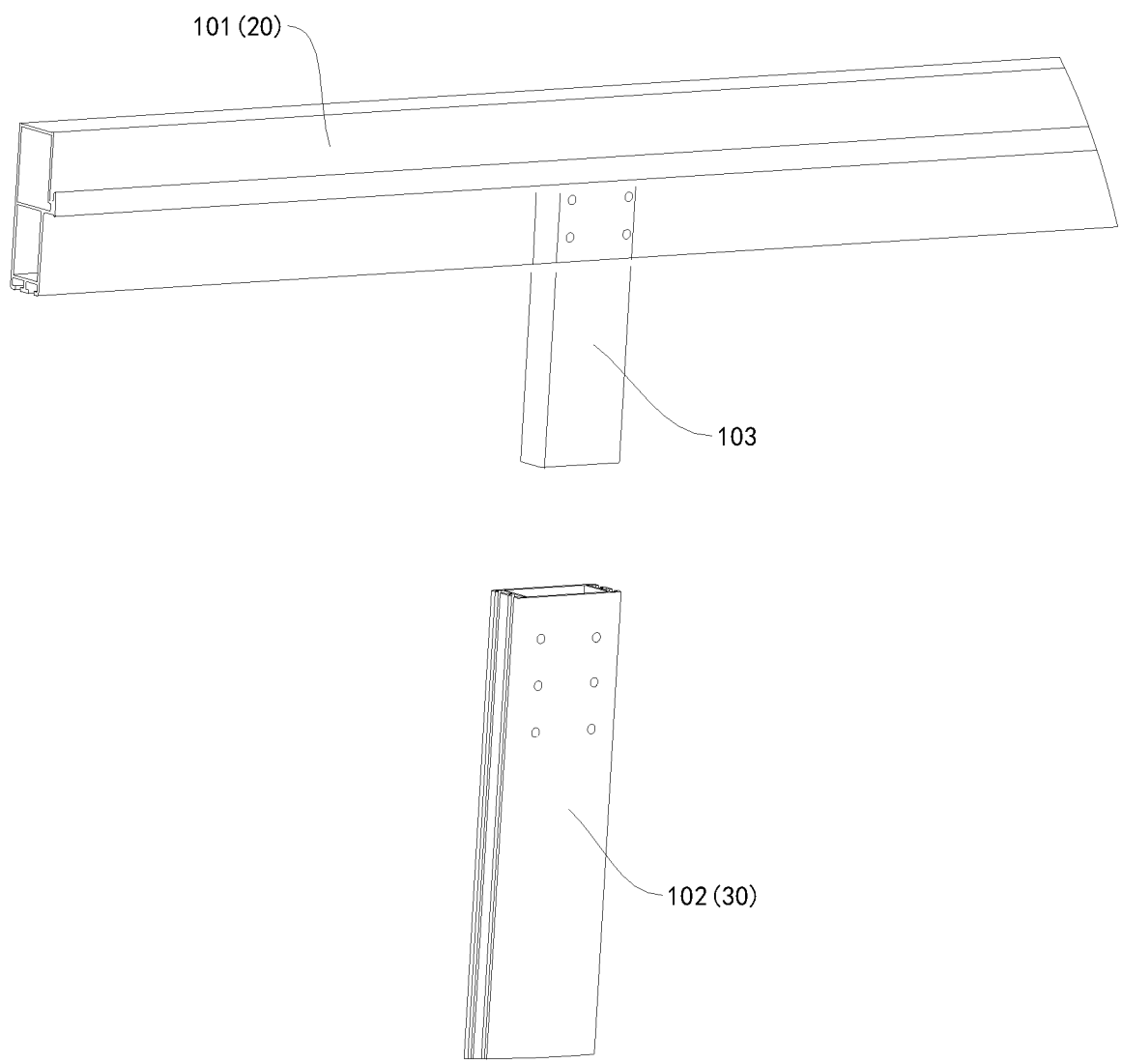
FIG. 5 is a schematic connection diagram of the transverse beam and the longitudinal beam of the body frame according to an embodiment of the disclosure.

In some specific examples of the disclosure, as shown in FIG. 5, the side top beam 101 is provided with a plug beam 103. The plug beam 103 is inserted into the side vertical beam 102, and the plug beam 103 is fixed to the side vertical beam 102 by riveting. Therefore, the high stress requirements for a door corner position can be satisfied.

Those skilled in the art can understand that, some side vertical beams 102 are located at a door structure and used as door pillars. Sizes of the all-cover joints 100 between the side vertical beams 102 and the side top beams 101 may be relatively large to satisfy the stress requirements. Some side vertical beams 102 are located at a window structure and used as window pillars. Sizes of the all-cover joints 100 between the side vertical beams 102 and the side top beam 101 may be relatively small to dispose the all-cover joints 100 properly according to different stress requirements.

Figure 6:
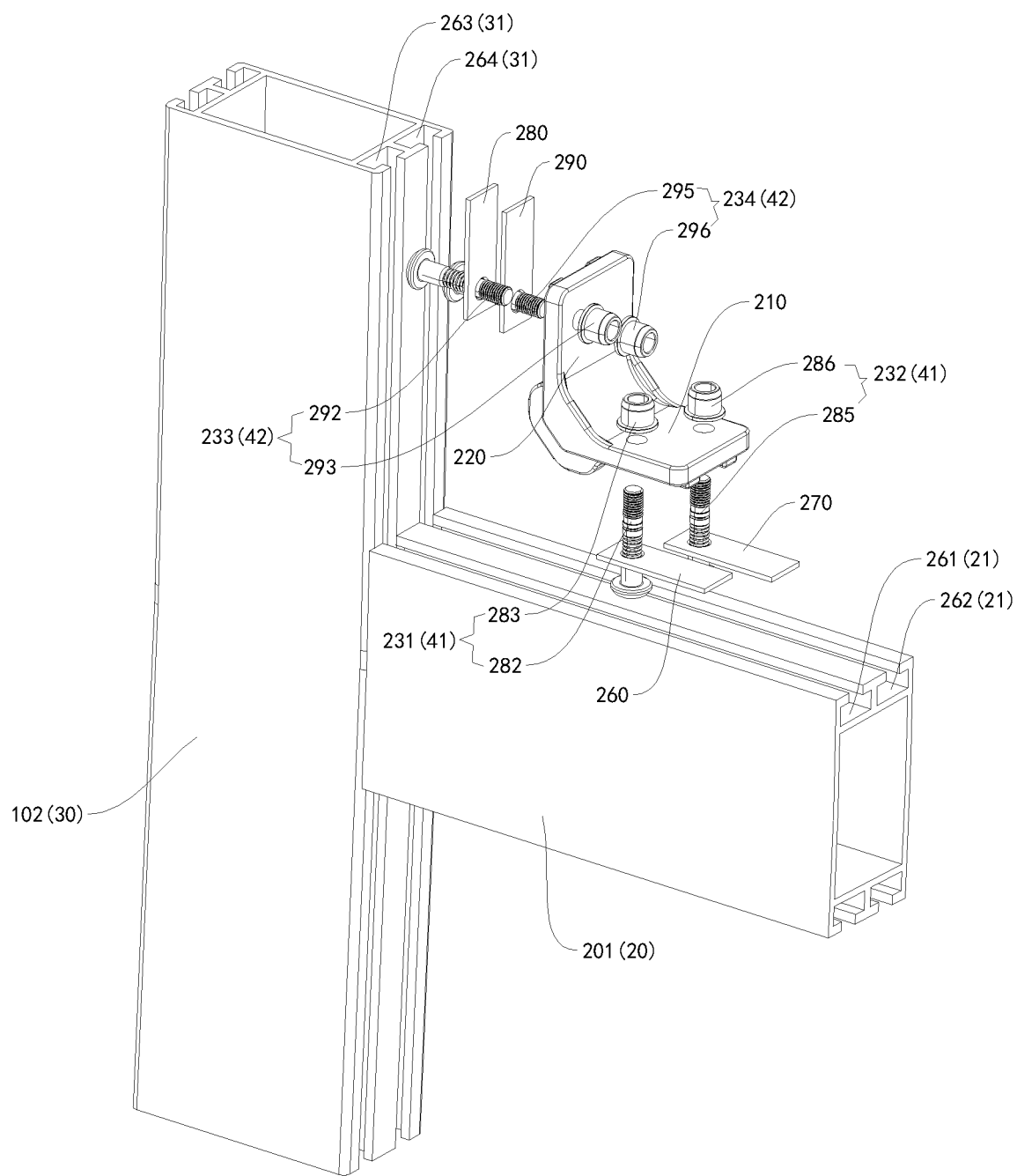
FIG. 6 is a schematic connection diagram of a semi-cover joint of the body frame according to an embodiment of the disclosure.
Figure 7:
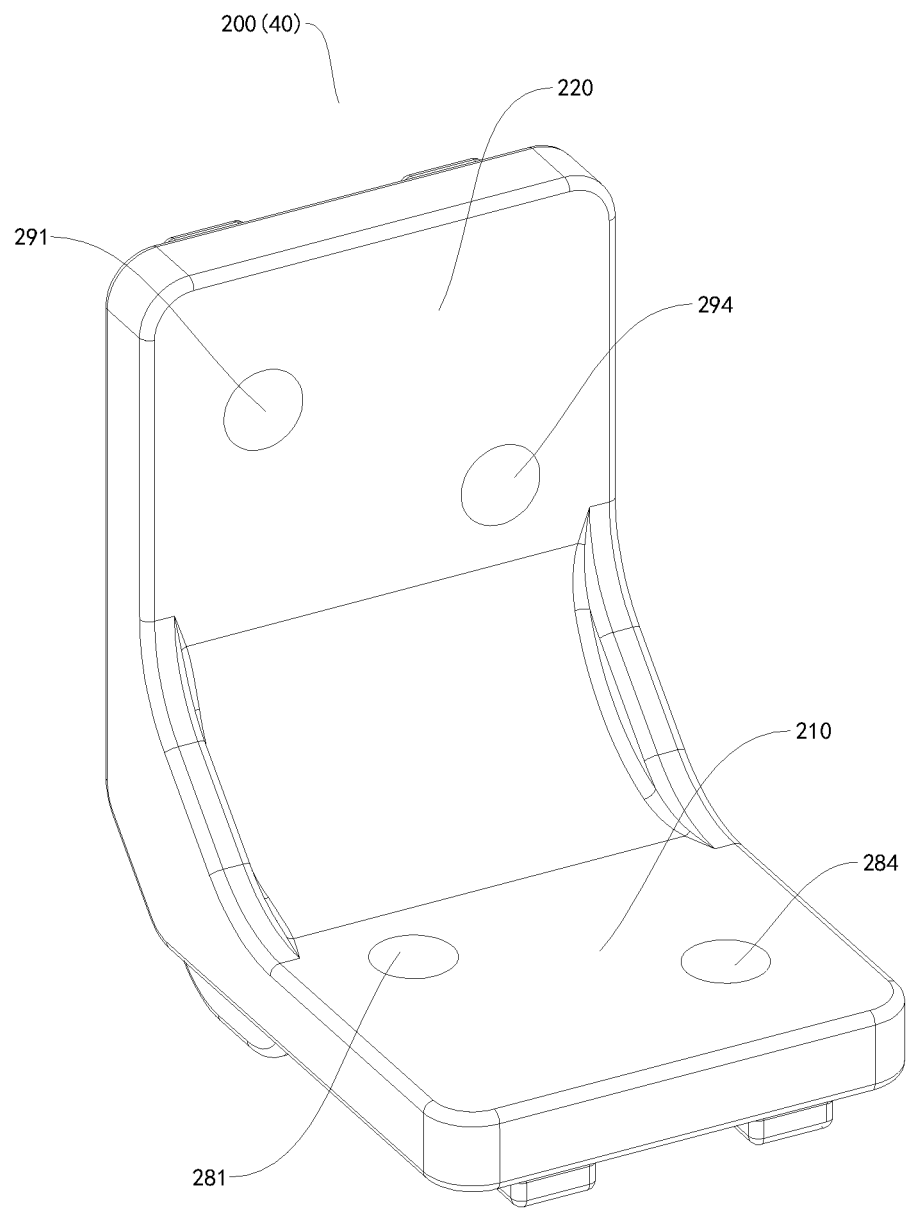
FIG. 7 is a schematic structural diagram of the semi-cover joint of the body frame according to an embodiment of the disclosure.

In some specific embodiments of the disclosure, as shown in FIG. 1, FIG. 6, and FIG. 7, the transverse beam 20 includes a side waist beam 201, the longitudinal beam 30 includes a side vertical beam 102, and the joint 40 includes a semi-cover joint 200 disposed at a junction of the side waist beam 201 and the side vertical beam 102.

The semi-cover joint 200 includes a transverse beam connecting plate 210 and a longitudinal beam connecting plate 220.

The transverse rivet 41 includes a third transverse rivet 231 and a fourth transverse rivet 232 disposed on the transverse beam connecting plate 210, and the transverse beam connecting plate 210 is mounted to the side waist beam 201 by the third transverse rivet 231 and the fourth transverse rivet 232. The longitudinal beam connecting plate 220 is connected with the transverse beam connecting plate 210. The longitudinal rivet 42 includes a third longitudinal rivet 233 and a fourth longitudinal rivet 234 disposed on the longitudinal beam connecting plate 220, and the longitudinal beam connecting plate 220 is mounted to the side vertical beam 102 by the third longitudinal rivet 233 and the fourth longitudinal rivet 234.

A central axis of the third transverse rivet 231 and a central axis of the third longitudinal rivet 233 are located in a first plane, and a central axis of the fourth transverse rivet 232 and a central axis of the fourth longitudinal rivet 234 are located in a second plane. The first plane and the second plane are disposed in parallel and perpendicular to the width direction of the body frame 10.

The third transverse rivet 231 and the fourth transverse rivet 232 are disposed on the transverse beam connecting plate 210, and the third longitudinal rivet 233 and the fourth longitudinal rivet 234 are disposed on the longitudinal beam connecting plate 220. Therefore, the transverse beam connecting plate 210 can be mounted to the side waist beam 201 by the third transverse rivet 231 and the fourth transverse rivet 232, and the longitudinal beam connecting plate 220 can be mounted to the side vertical beam 102 by the third longitudinal rivet 233 and the fourth longitudinal rivet 234. In addition, the first plane where the third transverse rivet 231 and the third longitudinal rivet 233 are located and the second plane where the fourth transverse rivet 232 and the fourth longitudinal rivet 234 are located are spaced apart from each other and disposed in parallel. Therefore, the semi-cover joint 200 and a mounting point of the body frame 10 connect the two planes, so that the stiffness and the strength of the semi-cover joint 200 are improved, and the torsion resistance is optimized.

The third transverse rivet 231 includes a third transverse screw rod 282 and a third transverse collar 283 riveted on the third transverse screw rod 282, and the fourth transverse rivet 232 includes a fourth transverse screw rod 285 and a fourth transverse collar 286 riveted on the fourth transverse screw rod 285. The third longitudinal rivet 233 includes a third longitudinal screw rod 292 and a third longitudinal collar 293 riveted on the third longitudinal screw rod 292, and the fourth longitudinal rivet 234 includes a fourth longitudinal screw rod 295 and a fourth longitudinal collar 296 riveted on the fourth longitudinal screw rod 295.

In some specific examples of the disclosure, as shown in FIG. 6 and FIG. 7, the transverse sliding groove 21 includes a third transverse sliding groove 261 and a fourth transverse sliding groove 262, and the longitudinal sliding groove 31 includes a third longitudinal sliding groove 263 and a fourth longitudinal sliding groove 264.

The transverse beam connecting plate 210 is provided with a third transverse screw rod hole 281 and a fourth transverse screw rod hole 284. The third transverse screw rod 282 passes through the third transverse screw rod hole 281 and is slidably mated with the third transverse sliding groove 261. The fourth transverse screw rod 285 passes through the fourth transverse screw rod hole 284 and is slidably mated with the fourth transverse sliding groove 262. The longitudinal beam connecting plate 220 is provided with a third longitudinal screw rod hole 291 and a fourth longitudinal screw rod hole 294. The third longitudinal screw rod 292 passes through the third longitudinal screw rod hole 291 and is slidably mated with the third longitudinal sliding groove 263. The fourth longitudinal screw rod 295 passes through the fourth longitudinal screw rod hole 294 and is slidably mated with the fourth longitudinal sliding groove 264.

The parts of the third transverse screw rod 282, the fourth transverse screw rod 285, the third longitudinal screw rod 292, and the fourth longitudinal screw rod 295 respectively exposed from the third transverse collar 283, the fourth transverse collar 286, the third longitudinal collar 293, and the fourth longitudinal collar 296 are required to be minimized to reduce the operation space and facilitate the designing of interior trim of the vehicle. The third transverse sliding groove 261 and the fourth transverse sliding groove 262 extend in the length direction of the body frame 10 and are spaced apart from each other along the width direction of the body frame 10. The third longitudinal sliding groove 263 and the fourth longitudinal sliding groove 264 extend in the height direction of the body frame 10 and are spaced apart from each other along the width direction of the body frame 10.

In some specific examples of the disclosure, as shown in FIG. 5 and FIG. 6, a third transverse gasket 260 between the third transverse screw rod 282 and the transverse beam connecting plate 210 is sleeved on the third transverse screw rod 282. The third transverse gasket 260 is slidably mated with the third transverse sliding groove 261. A fourth transverse gasket 270 between the fourth transverse screw rod 285 and the transverse beam connecting plate 210 is sleeved on the fourth transverse screw rod 285. The fourth transverse gasket 270 is slidably mated with the fourth transverse sliding groove 262.

A third longitudinal gasket 280 between the third longitudinal screw rod 292 and the longitudinal beam connecting plate 220 is sleeved on the third longitudinal screw rod 292. The third longitudinal gasket 280 is slidably mated with the third longitudinal sliding groove 263. A fourth longitudinal gasket 290 between the fourth longitudinal screw rod 295 and the longitudinal beam connecting plate 220 is sleeved on the fourth longitudinal screw rod 295. The fourth longitudinal gasket 290 is slidably mated with the fourth longitudinal sliding groove 264.

For example, the third transverse gasket 260, the fourth transverse gasket 270, the third longitudinal gasket 280, and the fourth longitudinal gasket 290 each may be a metal sheet, such as an aluminum alloy sheet. The third transverse gasket, the fourth transverse gasket, the third longitudinal gasket, and the fourth longitudinal gasket each may be provided with a through hole on a center line for mounting the third transverse screw rod 282, the fourth transverse screw rod 285, the third longitudinal screw rod 292, and the fourth longitudinal screw rod 295. Sizes of the through holes may be increased or decreased according to actual conditions. After the mounting is finished, the third transverse gasket 260, the fourth transverse gasket 270, the third longitudinal gasket 280, and the fourth longitudinal gasket 290 are respectively attached to bottoms of the third transverse sliding groove 261, the fourth transverse sliding groove 262, the third longitudinal sliding groove 263, and the fourth longitudinal sliding groove 264.

The third transverse gasket 260, the fourth transverse gasket 270, the third longitudinal gasket 280, and the fourth longitudinal gasket 290 use the aluminum sheets, so that the weight of the vehicle can be effectively reduced. In addition, when the side waist beam 201 and the side vertical beam 102 are stressed, loads are applied to contact surfaces of the third transverse gasket 260, the fourth transverse gasket 270, the third longitudinal gasket 280, and the fourth longitudinal gasket 290 with the third transverse sliding groove 261, the fourth transverse sliding groove 262, the third longitudinal sliding groove 263, and the fourth longitudinal sliding groove 264. Therefore, the stress concentration of the third transverse sliding groove 261, the fourth transverse sliding groove 262, the third longitudinal sliding groove 263, and the fourth longitudinal sliding groove 264 can be reduced, so that the requirements for the strength and the deformation of the body frame 10 can be satisfied.

Further, the third transverse rivet 231 is closer to the longitudinal beam connecting plate 220 than the fourth transverse rivet 232, and the fourth longitudinal rivet 234 is closer to the transverse beam connecting plate 210 than the third longitudinal rivet 233. The third transverse rivet 231 and the fourth transverse rivet 232 may be staggered from each other, and the third longitudinal rivet 233 and the fourth longitudinal rivet 234 may be staggered from each other. By virtue of different riveting sequences, the semi-cover joint 200 can be of a smaller size, the designing of interior trim of the vehicle can be more convenient, and the space and the time required for mounting can be reduced.

According to the above embodiments of the disclosure, the all-cover joint 100 and the semi-cover joint 200 are disposed. Therefore, corresponding adjustments may be performed according to different stress positions and the strength of the riveting structure to achieve the optimal cost performance.

In some specific embodiments of the disclosure, as shown in FIG. 1, the body frame 10 further includes a side skin 310 and an integrated transverse beam 320.

The transverse beam under the skin, a transverse beam for mounting a seat, and a transverse beam of an in-vehicle sealing plate are integrated as a whole by the integrated transverse beam 320, and the integrated transverse beam 320 is connected with a lower edge of the side skin 310. That is to say, by increasing a size in a height direction of the side skin 310, the transverse beam under the skin, the transverse beam for mounting the seat, and the transverse beam of the in-vehicle sealing plate are integrated as a whole to form the integrated transverse beam 320. Therefore, the structure is simplified, the rigidity of the vehicle is improved, and the internal sealing of the vehicle is enhanced. The side skin 310 not only provides an exterior decoration, but also shares the overall stress of the frame, effectively improving the rigidity of the vehicle.

Figure 8:
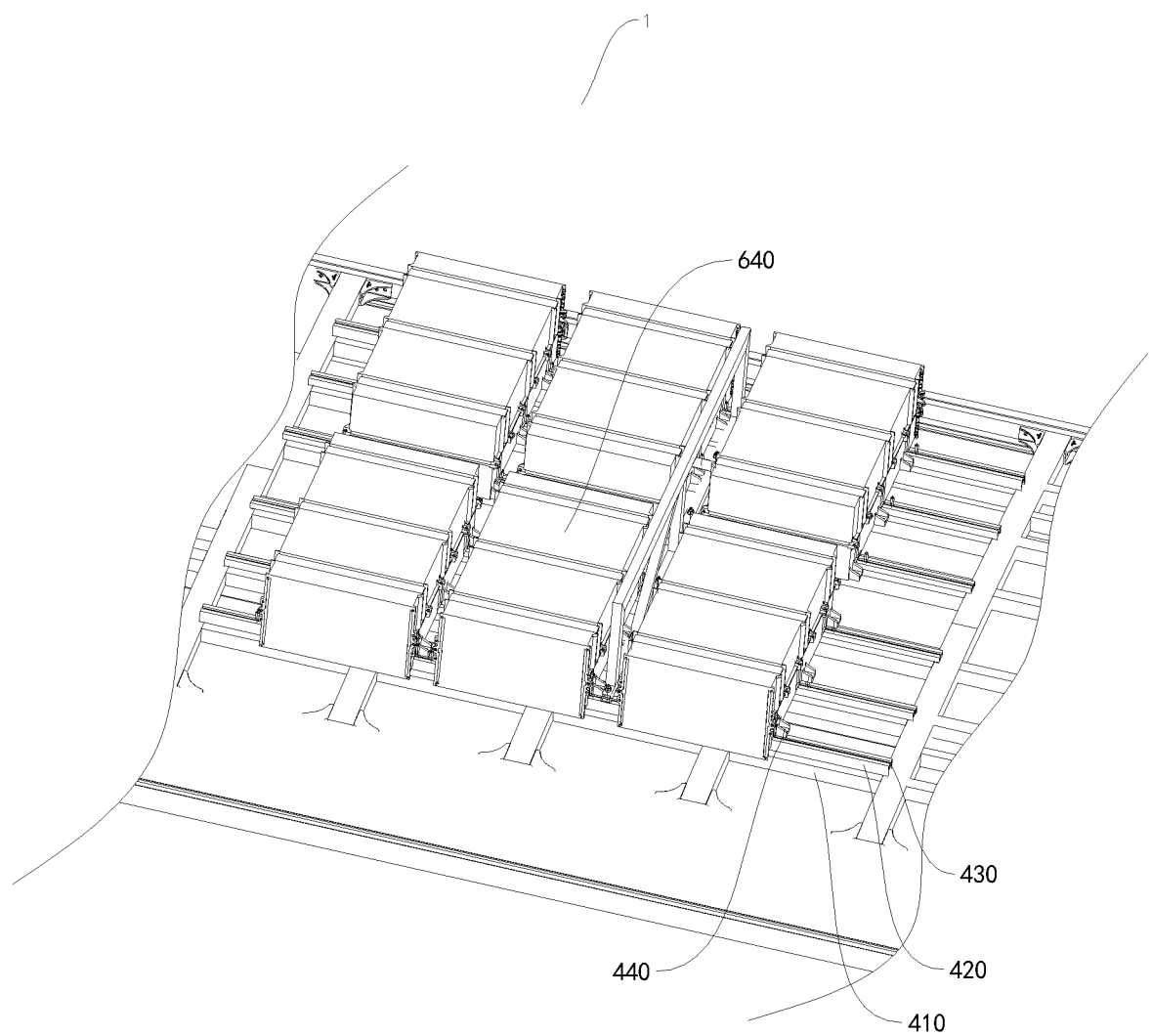
FIG. 8 is a partial schematic structural diagram of a top of the body frame according to an embodiment of the disclosure.
Figure 9:
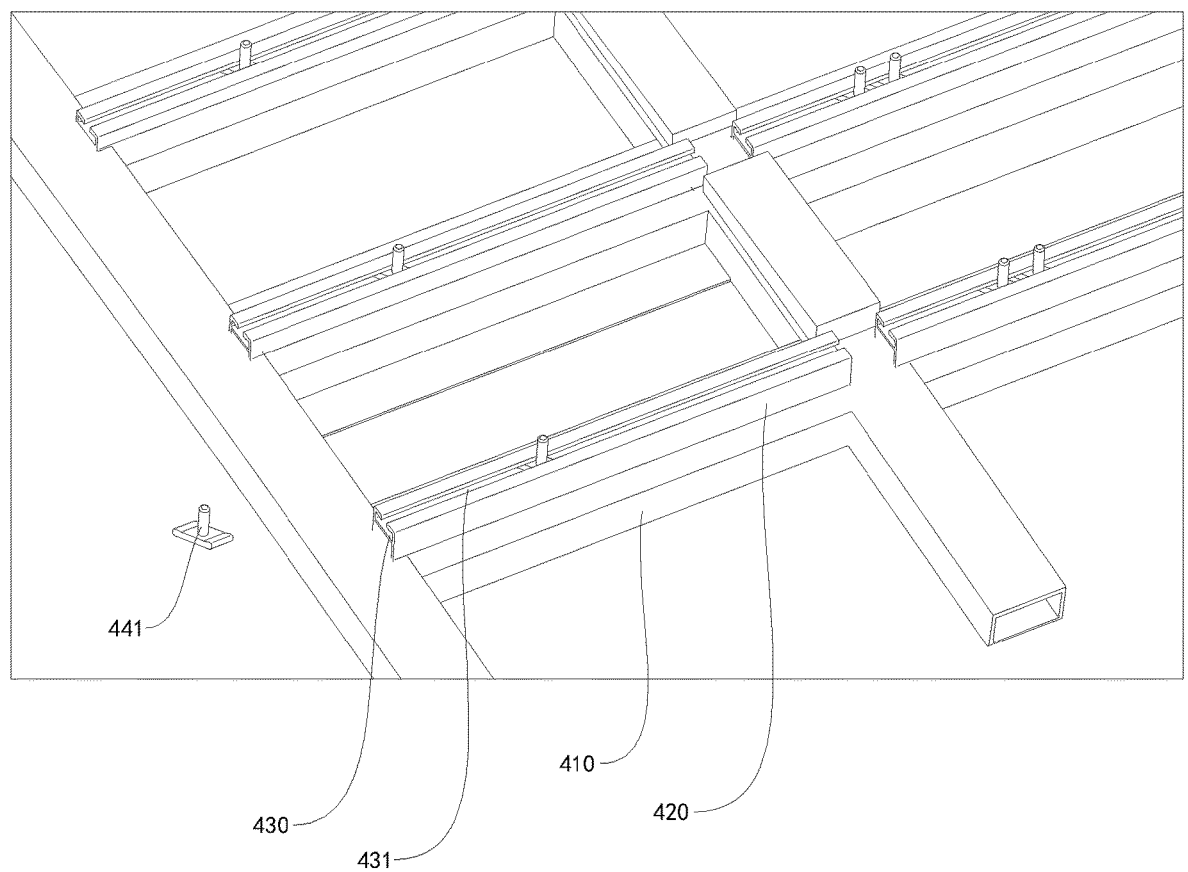
FIG. 9 is a schematic structural diagram of a top longitudinal beam of the body frame according to an embodiment of the disclosure.

In some specific embodiments of the disclosure, as shown in FIG. 8 and FIG. 9, the body frame 10 further includes a plurality of top longitudinal beams 410 and a plurality of support profiles 420.

The plurality of top longitudinal beams 410 are disposed along the length direction of the body frame 10 and spaced apart from each other along the width direction of the body frame 10. Each support profile 420 is disposed on the corresponding top longitudinal beam 410. The support profile 420 is configured with a battery pack sliding groove 430. A battery pack mounting member 440 is slidably mated with the battery pack sliding groove 430. A battery pack 450 is mounted to the support profile 420 of the top longitudinal beam 410 by the battery pack mounting member 440.

Therefore, the support profile 420 of the top longitudinal beam 410 is configured with the battery pack sliding groove 430 according to an expected mounting position of the battery pack 450, the mounted structure of the battery pack 450 is integrated with the top longitudinal beam 410, so that the structure and the space of the top longitudinal beam 410 are properly utilized. Therefore, the battery pack mounting bracket in related arts can be omitted, simplifying the structure, reducing the number of connecting components and the process steps, improving the production efficiency, and reducing the manufacturing costs and the weight of the body frame 10. In addition, the battery pack mounting bracket and the top frame in related arts are connected by a bolt, a torque of the bolt is easy to attenuate, and stress is easy to concentrate at a fixing point. The risk is reduced for the body frame 10 according to this embodiment of the disclosure. Moreover, the battery pack 450 is mounted by the battery pack sliding groove 430, and the battery pack mounting member 440 is slidable in the battery pack sliding groove 430, reducing the operation difficulty, thereby facilitating the control of the assembly accuracy and the mounting point accuracy.

As shown in FIG. 8 and FIG. 9, at least one end of the battery pack sliding groove 430 is open, and the battery pack sliding groove 430 has a slot 431. A width of the slot 431 is less than a width of the battery pack sliding groove 430. Specifically, at least one of two length ends of the battery pack sliding groove 430 is unclosed, that is to say, one end in a length direction of the battery pack sliding groove 430 is closed and the other end is open, or both ends in the length direction of the battery pack sliding groove 430 are open. An opening of the slot 431 is disposed upward, a length of the slot 431 is same as the length of the battery pack sliding groove 430, and the width of the battery pack sliding groove 430 is greater than the width of the slot 431.

The battery pack mounting member 440 includes a bolt 441 and a nut (not shown in the figure). A nut of the bolt 441 is mated with the battery pack sliding groove 430, a screw of the bolt 441 extends from the slot 431 into the mounted structure of the battery pack 450, and the nut is screwed to a stud of the bolt 441 for locking.

Specifically, the bolt 441 may enter the battery pack sliding groove 430 from the open end of the battery pack sliding groove 430. After entering the battery pack sliding groove 430, the stud of the bolt 441 extends upward from the slot 431. Since the width of the slot 431 is less than the width of the battery pack sliding groove 430, the nut of the bolt 441 is blocked from engagement. The bolt 441 can only be slid along the battery pack sliding groove 430. When the bolt reaches a predetermined position, the nut may be screwed to fasten the battery pack 450.

Further, the nut of the bolt 441 is a rectangle or a parallelogram. Therefore, after entering the battery pack sliding groove 430, the nut of the bolt 441 can only be slid along the length of the battery pack sliding groove 430, and cannot be rotated, facilitating screwing or unscrewing of the nut.

Figure 10:
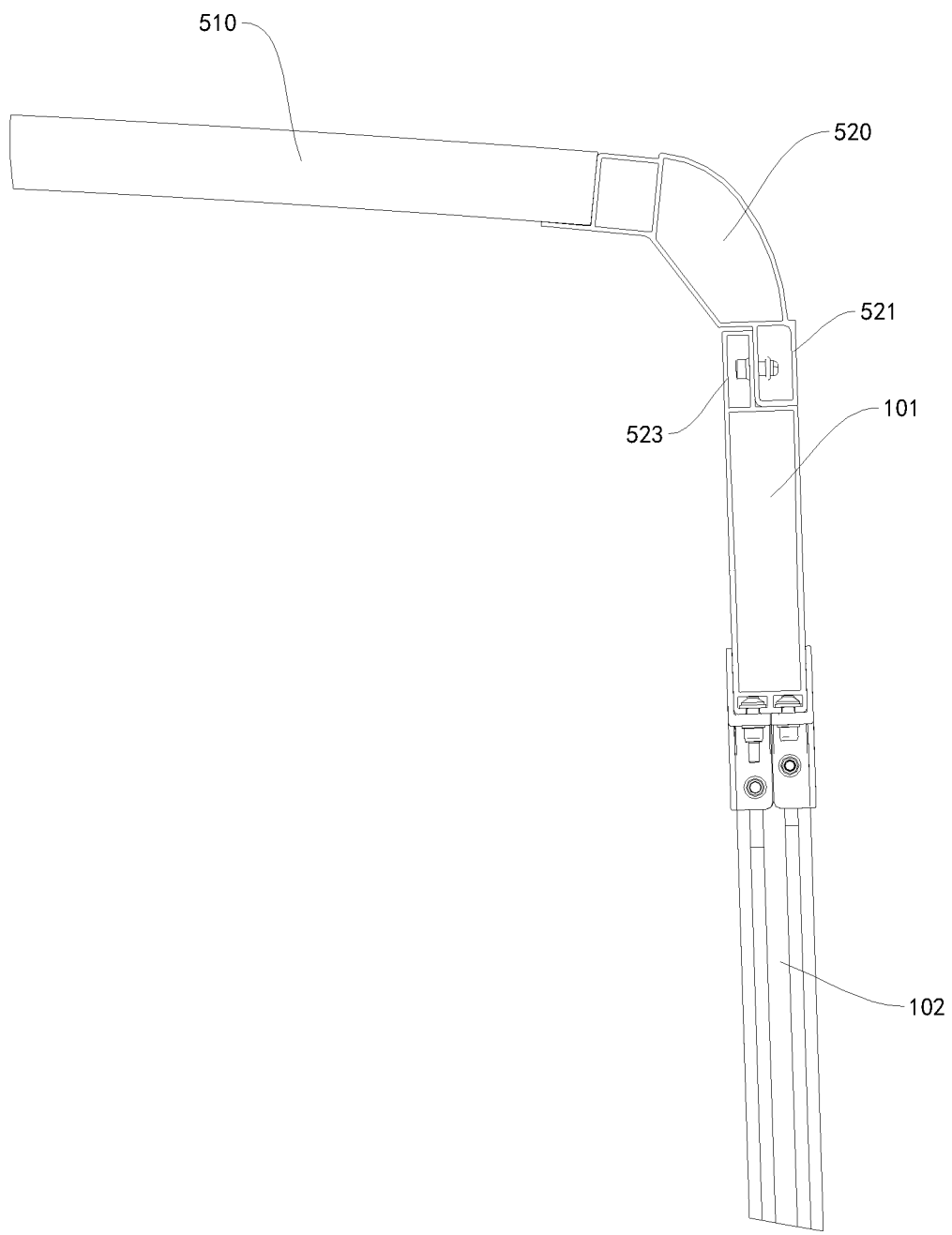
FIG. 10 is a schematic connection diagram of a top transverse beam and a side vertical beam of the body frame according to an embodiment of the disclosure.

In some specific embodiments of the disclosure, as shown in FIG. 1 and FIG. 10, the body frame 10 further includes a plurality of top transverse beams 510, a top edge beam 520, a plurality of side vertical beams 102, and a side top beam 101.

The top edge beam 520 extends in the length direction of the body frame 10 and is connected with the plurality of top transverse beams 510. The side top beam 101 extends in the length direction of the body frame 10 and is connected with the plurality of side vertical beams 102. The top edge beam 520 and the side top beam 101 are riveted.

Specifically, the top edge beam 520 is configured with an outer connecting edge 521 and an inner slot located inside the outer connecting edge 521, and the side top beam 101 is configured with an inner connecting edge 523 and an outer slot located outside the inner connecting edge 523. The outer connecting edge 521 is inserted into the outer slot, and the inner connecting edge 523 is inserted into the inner slot. That is to say, the outer connecting edge 521 is located outside the inner connecting edge 523, and the outer connecting edge 521 and the inner connecting edge 523 are riveted.

The top edge beam 520 and the top transverse beam 510 are fixed to ensure the accuracy, and the side top beam 101 and the side vertical beam 102 are fixed to ensure the accuracy, and then the top edge beam 520 and the side top beam 101 are sandwiched and adjusted to an assembly position by tooling and riveted and fixed by blind studs, so as to achieve the purpose of simple assembly operations and controllable accuracy.

Figure 11:
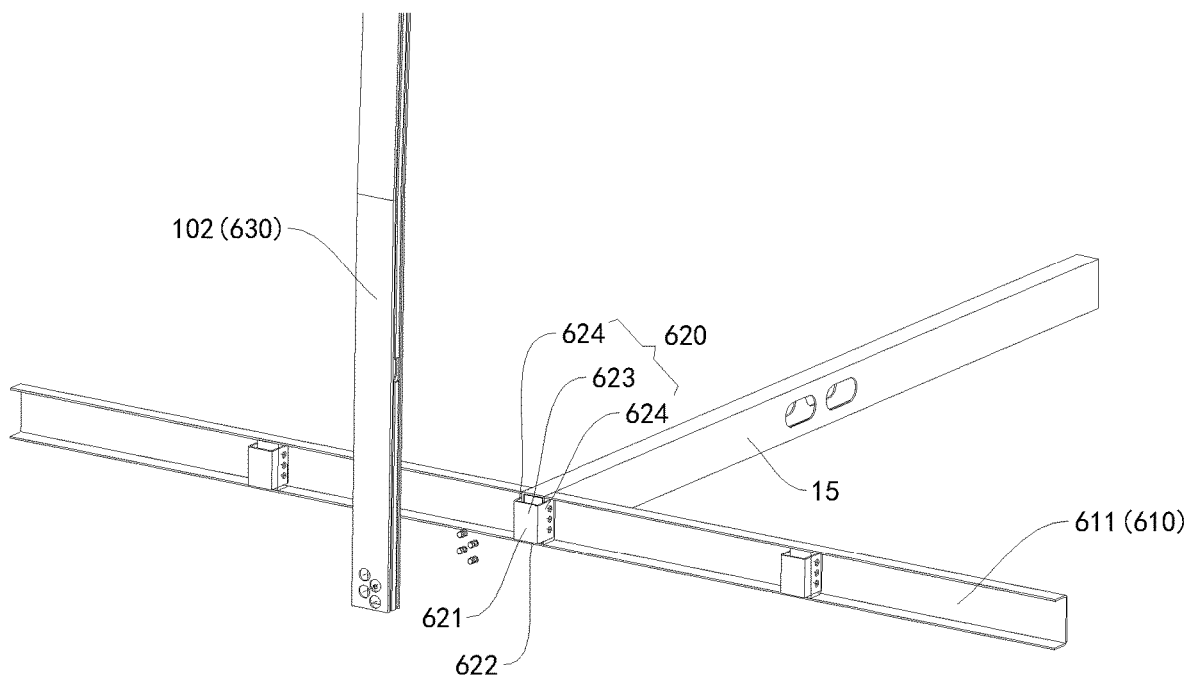
FIG. 11 is a schematic connection diagram of a side frame and a rack of the body frame according to an embodiment of the disclosure.

In some specific embodiments of the disclosure, as shown in FIG. 1 and FIG. 11, the body frame 10 further includes a rack 610, a corbel mounting plate 620, and a side frame 630.

The corbel mounting plate 620 is mounted to the rack 610 and has a mounting surface 621. An adjustment gap 622 exists between the mounting surface 621 and the rack 610. The side frame 630 is mounted to the mounting surface 621 of the corbel mounting plate 620.

The mounting surface 621 is disposed on the corbel mounting plate 620, and the adjustment gap 622 exists between the mounting surface 621 and the rack 610. Therefore, a distance between the mounting surface 621 and the rack 610 may be adjusted by adjusting a size of the gap 622. In this way, it can be ensured that the mounting surface 621 of the corbel mounting plate 620 is located on a same plane, thereby eliminating a gap between the side frame 630 and the corbel mounting plate 620, and ensuring the flatness of the assembly.

For example, the corbel mounting plate 620 is mounted to a side surface along a width direction of the rack 610, and the mounting surface 621 and the side surface of the rack 610 are spaced apart from each other along the width direction of the rack 610 to form the adjustment gap 622. Therefore, the corbel mounting plate 620 can be adjusted along the width direction of the rack 610, the manufacturing error can be removed during mounting of the corbel mounting plate 620, and the mounting surface 621 of the corbel mounting plate 620 can be ensured to be flat, thereby ensuring the accuracy of the assembly of the side frame 630 and the rack 610.

In addition, since the flatness of the assembly of the side frame 630 and the rack 610 has been improved, gaskets and bolt connection are no longer required, reducing the assembly time and the material costs, avoiding subsequent torque attenuation, and significantly improving the strength of the integrated structure and the driving safety.

Specifically, the rack 610 has a rack edge beam 611, and the side frame 630 has a side vertical beam 102. The corbel mounting plate 620 includes a corbel connecting plate 623 and two corbel side plates 624. The two corbel side plates 624 are respectively connected with two opposite sides of the corbel connecting plate 623. The two corbel side plates 624 are disposed in parallel and perpendicular to the corbel connecting plate 623, and a cross section of the corbel mounting plate 620 is configured as a U shape.

The two corbel side plates 624 are mounted to the rack edge beam 611, the mounting surface 621 is formed on a surface of the corbel connecting plate 623 facing away from the rack edge beam 611, the adjustment gap 622 is formed between the corbel connecting plate 623 and the rack edge beam 611, and the side vertical beam 102 is mounted to the mounting surface 621 of the corbel connecting plate 623, for example, the side vertical beam 102 is riveted on the mounting surface 621 of the corbel connecting plate 623.

Therefore, by means of the corbel mounting plate 620, the body frame 10 can be adjusted along the width direction. In a low-floor area in the middle of the vehicle, a relatively small corbel mounting plate 620 is welded to the rack edge beam 611, not only ensuring the structural strength, but also ensuring the mounting flatness of the floor surface inside the vehicle.

Figure 12:
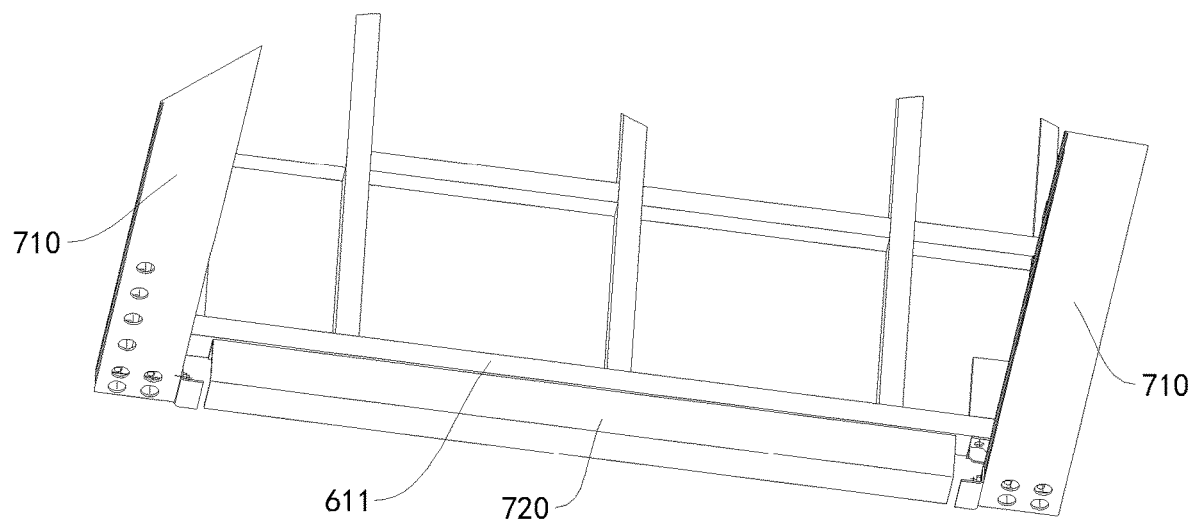
FIG. 12 is a schematic connection diagram of door pillars and a rack edge beam of the body frame according to an embodiment of the disclosure.

In some specific embodiments of the disclosure, as shown in FIG. 1 and FIG. 12, the body frame 10 further includes door pillars 710, a rack edge beam 611, and a rack doorframe beam 720.

The door pillars 710 and the rack edge beam 611 are riveted. The rack doorframe beam 720 is connected with the rack edge beam 611 and located between the door pillars 710. Specifically, the rack doorframe beam 720 is first welded and fixed to the rack edge beam 611, and then the door pillars 710 and the rack edge beam 611 are riveted and fixed by a blind stud. The structure not only reduces the occupied space under a doorframe, but also ensures the connection strength of the doorframe.

A vehicle 1 according to an embodiment of the disclosure is described below. The vehicle 1 may be a large bus.

Figure 13:
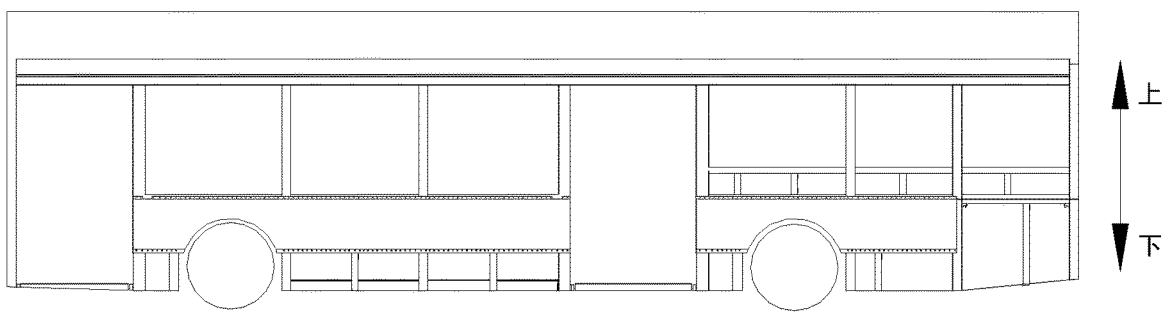
FIG. 13 is a schematic structural diagram of a vehicle according to an embodiment of the disclosure.

As shown in FIG. 13, the vehicle 1 according to this embodiment of the disclosure includes the body frame 10 according to the above embodiments of the disclosure. The body frame 10 may be an aluminum alloy part to achieve a light weight.

By means of the body frame 10 according to the above embodiments of the disclosure, the vehicle 1 according to this embodiment of the disclosure achieves a stable and reliable structure and high production efficiency.

Other configurations and operations of the vehicle 1 according to the embodiments of the disclosure are known to those of ordinary skill in the art and will not be described in detail herein.

In the description of this specification, description of reference terms such as "a specific embodiment" or "a specific example", means including specific features, structures, materials, or features described in the embodiment or example in at least one embodiment or example of the disclosure. In this specification, exemplary descriptions of the afore-mentioned terms do not necessarily refer to the same embodiment or example.

Although the embodiments of the disclosure have been shown and described, a person of ordinary skill in the art should understand that various changes, modifications, replacements and variations may be made to the embodiments without departing from the principles and spirit of the disclosure, and the scope of the disclosure is as defined by the appended claims and their equivalents.

What is claimed is:

1. A body frame, comprising:
a transverse beam having a first transverse sliding groove;

a longitudinal beam having a first longitudinal sliding groove, the longitudinal beam being connected with the transverse beam; and a joint disposed at a junction of the transverse beam and the longitudinal beam, the joint being mounted to the transverse beam by a first transverse fastener and mounted to the longitudinal beam by a first longitudinal fastener;

wherein the first transverse fastener is slidably mated with the first transverse sliding groove and the first longitudinal fastener is slidably mated with the first longitudinal sliding groove;

wherein the transverse beam comprises a side top beam, the longitudinal beam comprises a side vertical beam, the joint comprises an all-cover joint disposed at a junction of the side top beam and the side vertical beam;

wherein the all-cover joint comprises a first sub-joint and a second sub-joint; and wherein engagement of the first sub-joint and the second sub-joint defines a transverse beam connection groove configured to accommodate the side top beam and a longitudinal beam connection groove configured to accommodate the side vertical beam.

2. The body frame according to claim 1, wherein the first sub-joint comprises a first transverse beam connecting plate, a first longitudinal beam connecting plate, and a first side plate, the first transverse beam connecting plate being connected with the first longitudinal beam connecting plate and the first side plate being connected with a side of the first transverse beam connecting plate and the first longitudinal beam connecting plate away from the second sub-joint; and wherein the second sub-joint comprises a second transverse beam connecting plate, a second longitudinal beam connecting plate, and a second side plate, the second transverse beam connecting plate being connected with the second longitudinal beam connecting plate and the second side plate being connected with a side of the second transverse beam connecting plate and the second longitudinal beam connecting plate away from the first sub-joint.

3. The body frame according to claim 1, wherein the transverse beam includes a second transverse sliding groove and the longitudinal beam includes a second longitudinal sliding groove, the first and second transverse sliding grooves extending in a length direction of the body frame and the first and second longitudinal sliding grooves extending in a height direction of the body frame.

4. The body frame according to claim 3, further comprising a second transverse fastener and a second longitudinal fastener;

wherein the first transverse beam connecting plate comprises a first transverse screw rod hole and the first transverse fastener comprises a first transverse screw rod mated with the first transverse screw rod hole and a first transverse collar fastened on the first transverse screw rod, the first transverse screw rod being slidably mated with the first transverse sliding groove;

wherein the second transverse beam connecting plate comprises a second transverse screw rod hole and the second transverse fastener comprises a second transverse screw rod mated with the second transverse screw rod hole and a second transverse collar fastened on the second transverse screw rod, the second transverse screw rod being slidably mated with the second transverse sliding groove;

wherein the first longitudinal beam connecting plate comprises a first longitudinal screw rod hole and the first longitudinal fastener comprises a first longitudinal screw rod mated with the first longitudinal screw rod hole and a first longitudinal collar fastened on the first longitudinal screw rod, the first longitudinal screw rod being slidably mated with the first longitudinal sliding groove; and wherein the second longitudinal beam connecting plate comprises a second longitudinal screw rod hole and the second longitudinal fastener comprises a second longitudinal screw rod mated with the second longitudinal screw rod hole and a second longitudinal collar fastened on the second longitudinal screw rod the second longitudinal screw rod being slidably mated with the second longitudinal sliding groove.

5. The body frame according to claim 4, further comprising, a first transverse mating element sleeved on the first transverse rod between the first transverse screw rod and the first transverse beam connecting plate, the first transverse mating element being slidably mated with the first transverse sliding groove; and a second transverse mating element sleeved on the second transverse screw rod between the second transverse screw rod and the second transverse beam connecting plate, the second transverse mating element being slidably mated with the second transverse sliding groove.

6. The body frame according to claim 5, further comprising a first longitudinal mating element sleeved on the first longitudinal screw rod between the first longitudinal screw rod and the first longitudinal beam connecting plate and a second longitudinal mating element sleeved on the second longitudinal screw rod between the second longitudinal screw rod and the second longitudinal beam connecting plate;

wherein the first longitudinal mating element is slidably mated with the first longitudinal sliding groove and the second longitudinal mating element is slidably mated with the second longitudinal sliding groove.

7. The body frame according to claim 1, wherein the side top beam comprises a plug beam; and wherein the plug beam is inserted into the side vertical beam and fixed to the side vertical beam by one or more fasteners.

8. The body frame according to claim 1, further comprising:

a plurality of top transverse beams;

a top edge beam extending in the length direction of the body frame and connected with the plurality of top transverse beams;

a plurality of side vertical beams; and a side top beam extending in the length direction of the body frame and connected with the plurality of side vertical beams;

wherein the top edge beam and the side top beam are fastened.

9. The body frame according to claim 1, further comprising:

a rack;

a corbel mounting plate mounted to the rack and having a mounting surface, wherein an adjustment gap exists between the mounting surface and the rack; and a side frame mounted to the mounting surface of the corbel mounting plate.

10. The body frame according to claim 1, further comprising:
a door pillars;
a rack edge beam riveted to the door pillars; and
a rack doorframe beam connected with the rack edge beam and located between the door pillars.

11. A vehicle comprising a body frame and a motor, wherein the body frame comprises:
a transverse beam having a first transverse sliding groove;
a longitudinal beam having a first longitudinal sliding groove, the longitudinal beam being connected with the transverse beam; and
a joint disposed at a junction of the transverse beam and the longitudinal beam, the joint being mounted to the transverse beam by a first transverse fastener and mounted to the longitudinal beam by a first longitudinal fastener;
wherein the first transverse fastener is slidably mated with the first transverse sliding groove and the first longitudinal fastener is slidably mated with the first longitudinal sliding groove;
wherein the transverse beam comprises a side top beam, the longitudinal beam comprises a side vertical beam, the joint comprises an all-cover joint disposed at a junction of the side top beam and the side vertical beam;
wherein the all-cover joint comprises a first sub-joint and a second sub-joint; and
wherein engagement of the first sub-joint and the second sub-joint defines a transverse beam connection groove configured to accommodate the side top beam and a longitudinal beam connection groove configured to accommodate the side vertical beam.

12. The vehicle according to claim 11, wherein the first sub-joint comprises a first transverse beam connecting plate, a first longitudinal beam connecting plate, and a first side plate, the first transverse beam connecting plate being connected with the first longitudinal beam connecting plate and the first side plate being connected with a side of the first transverse beam connecting plate and the first longitudinal beam connecting plate away from the second sub-joint; and
wherein the second sub-joint comprises a second transverse beam connecting plate, a second longitudinal beam connecting plate, and a second side plate, the second transverse beam connecting plate being connected with the second longitudinal beam connecting plate and the second side plate being connected with a side of the second transverse beam connecting plate and the second longitudinal beam connecting plate away from the first sub-joint.

13. The vehicle according to claim 11, wherein the transverse beam includes a second transverse sliding groove and the longitudinal beam includes a second longitudinal sliding groove, the first and second transverse sliding grooves extending in a length direction of the body frame and the first and second longitudinal sliding grooves extending in a height direction of the body frame.

14. The vehicle according to claim 13, further comprising a second transverse fastener and a second longitudinal fastener;
wherein the first transverse beam connecting plate comprises a first transverse screw rod hole and the first transverse fastener comprises a first transverse screw rod mated with the first transverse screw rod hole and a first transverse collar fastened on the first transverse screw rod, the first transverse screw rod being slidably mated with the first transverse sliding groove;
wherein the second transverse beam connecting plate comprises a second transverse screw rod hole and the second transverse fastener comprises a second transverse screw rod mated with the second transverse screw rod hole and a second transverse collar fastened on the second transverse screw rod, the second transverse screw rod being slidably mated with the second transverse sliding groove;
wherein the first longitudinal beam connecting plate comprises a first longitudinal screw rod hole and the first longitudinal fastener comprises a first longitudinal screw rod mated with the first longitudinal screw rod hole and a first longitudinal collar fastened on the first longitudinal screw rod, the first longitudinal screw rod being slidably mated with the first longitudinal sliding groove; and
wherein the second longitudinal beam connecting plate comprises a second longitudinal screw rod hole and the second longitudinal fastener comprises a second longitudinal screw rod mated with the second longitudinal screw rod hole and a second longitudinal collar fastened on the second longitudinal screw rod the second longitudinal screw rod being slidably mated with the second longitudinal sliding groove.

15. The body frame according to claim 14, further comprising,
a first transverse mating element sleeved on the first transverse screw rod between the first transverse screw rod and the first transverse beam connecting plate, the first transverse mating element being slidably mated with the first transverse sliding groove; and
a second transverse mating element sleeved on the second transverse screw rod between the second transverse screw rod and the second transverse beam connecting plate, the second transverse mating element being slidably mated with the second transverse sliding groove.

16. The body frame according to claim 14, further comprising a first longitudinal mating element sleeved on the first longitudinal screw rod between the first longitudinal screw rod and the first longitudinal beam connecting plate and a second longitudinal mating element sleeved on the second longitudinal screw rod between the second longitudinal screw rod and the second longitudinal beam connecting plate;
wherein the first longitudinal mating element is slidably mated with the first longitudinal sliding groove and the second longitudinal mating element is slidably mated with the second longitudinal sliding groove.

17. The vehicle according to claim 11, wherein the side top beam comprises a plug beam; and wherein the plug beam is inserted into the side vertical beam and fixed to the side vertical beam by one or more fasteners.

18. The vehicle according to claim 11, further comprising:
a plurality of top transverse beams;
a top edge beam extending in the length direction of the body frame and connected with the plurality of top transverse beams;
a plurality of side vertical beams; and
a side top beam extending in the length direction of the body frame and connected with the plurality of side vertical beams;
wherein the top edge beam and the side top beam are riveted.

19. The vehicle according to claim 11, further comprising:
a rack;

a corbel mounting plate mounted to the rack and having a mounting surface, wherein an adjustment gap exists between the mounting surface and the rack; and
a side frame mounted to the mounting surface of the corbel mounting plate.

20. The vehicle according to claim 11, further comprising:
door pillars;
a rack edge beam riveted to the door pillars; and
a rack doorframe beam connected with the rack edge beam and located between the door pillars.

* * * * *